(12) United States Patent
Park et al.

(10) Patent No.: US 12,457,487 B2
(45) Date of Patent: Oct. 28, 2025

(54) ELECTRONIC DEVICE AND METHOD FOR INSTALLING eSIM PROFILE IN ELECTRONIC DEVICE

(71) Applicant: Samsung Electronics Co., Ltd., Gyeonggi-do (KR)

(72) Inventors: Sanghyun Park, Gyeonggi-do (KR); Heangsu Kim, Gyeonggi-do (KR); Jieun Jung, Gyeonggi-do (KR); Myungkeun Oh, Gyeonggi-do (KR); Jinwan An, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 395 days.

(21) Appl. No.: 17/751,146

(22) Filed: May 23, 2022

(65) Prior Publication Data

US 2023/0041033 A1    Feb. 9, 2023

Related U.S. Application Data

(63) Continuation of application No. PCT/KR2022/005630, filed on Apr. 20, 2022.

(30) Foreign Application Priority Data

Aug. 6, 2021  (KR) .......................... 10-2021-0103558

(51) Int. Cl.
*H04W 8/20*  (2009.01)
*H04L 9/32*  (2006.01)
(Continued)

(52) U.S. Cl.
CPC ........... *H04W 8/205* (2013.01); *H04L 9/3213* (2013.01); *H04W 8/183* (2013.01); *H04W 12/06* (2013.01); *H04W 12/35* (2021.01)

(58) Field of Classification Search
CPC ..... H04W 8/205; H04W 8/183; H04W 12/06; H04W 12/35; H04W 8/20; H04W 12/40; H04W 88/02; H04L 9/3213
See application file for complete search history.

(56) References Cited

U.S. PATENT DOCUMENTS 10,187,784 B1    1/2019   Chen et al.
10,687,204 B1    6/2020   Roy et al.
(Continued)

FOREIGN PATENT DOCUMENTS

CN       110798836       2/2020
KR    10-2018-0062923    6/2018
(Continued)

OTHER PUBLICATIONS

European Search Report dated Aug. 1, 2024 issued in counterpart application No. 22853225.5-1215, 12 pages.
(Continued)

*Primary Examiner* — Dinh Nguyen
(74) *Attorney, Agent, or Firm* — The Farrell Law Firm, P.C.

(57) ABSTRACT

An electronic device includes a communication module, an embedded-subscriber identification module (eSIM) in which at least one profile is stored, and a processor. The processor is configured to, when accessing a server and succeeding in authentication for a first profile among at least one profile stored in the eSIM, receive an authentication token indicating successful authentication for the first profile from the server, when establishing communication with a first electronic device through the communication module, inform the first electronic device that the first profile is transmittable data, and when transmission of the first profile is requested from the first electronic device, transmit, to the first electronic device, the authentication token for downloading a
(Continued)

second profile corresponding to the first profile from the server.

8 Claims, 10 Drawing Sheets

(51) Int. Cl.
    *H04W 8/18*     (2009.01)
    *H04W 12/06*     (2021.01)
    *H04W 12/30*     (2021.01)

(56) References Cited

U.S. PATENT DOCUMENTS

| | | |
|---|---|---|
| 10,764,746 B1* | 9/2020 | Dreiling ................ H04W 8/26 |
| 2016/0241537 A1 | 8/2016 | Cha et al. |
| 2016/0277930 A1 | 9/2016 | Li et al. |
| 2017/0142121 A1* | 5/2017 | Lee ................ H04L 63/0853 |
| 2017/0244837 A1 | 8/2017 | Kim et al. |
| 2018/0270219 A1 | 9/2018 | Li |
| 2019/0075453 A1 | 3/2019 | Yoon et al. |
| 2020/0137566 A1 | 4/2020 | Jin et al. |
| 2020/0228969 A1 | 7/2020 | Shin et al. |
| 2020/0314635 A1 | 10/2020 | Park et al. |
| 2021/0006964 A1 | 1/2021 | Lee et al. |
| 2021/0084465 A1 | 3/2021 | Hadadi et al. |

FOREIGN PATENT DOCUMENTS

| | | |
|---|---|---|
| KR | 10-2018-0110202 | 10/2018 |
| KR | 1020190027488 | 3/2019 |
| KR | 1020200114392 | 10/2020 |
| KR | 1020200145775 | 12/2020 |
| KR | 1020210004809 | 1/2021 |
| KR | 10-2227262 | 3/2021 |

OTHER PUBLICATIONS

International Search Report dated Aug. 3, 2022 Issued in counterpart application No. PCT/KR2022/005630, 9 pages.
EP Communication Report dated Jan. 29, 2025 issued in counterpart application No. 22853225.5-1215, 8 pages.
EP Communication Report dated Sep. 24, 2025 issued in counterpart application No. 22853225.5-1206, 9 pages.

* cited by examiner

ELECTRONIC DEVICE AND METHOD FOR INSTALLING eSIM PROFILE IN ELECTRONIC DEVICE

CROSS-REFERENCE TO RELATED APPLICATION(S)

This application is a Bypass Continuation Application of PCT International Application No. PCT/KR2022/005630, which was filed on Apr. 20, 2022, in the Korean Intellectual Property Office, and claims priority to Korean Patent Application No. 10-2021-0103558, which was filed on Aug. 6, 2021, in the Korean Intellectual Property Office, the entire content of each of which is incorporated herein by reference.

BACKGROUND

1. Field

The disclosure relates generally to an electronic device and a method for installing an embedded subscriber identity module (eSIM) profile in the electronic device.

2. Description of Related Art

After a user of an electronic device subscribes to a wireless communication service, the user may use a network and application services of a communication service provider by inserting a removable physical subscriber identity module (SIM) card provided by the communication service provider into the electronic device. When replacing the electronic device, the user may use the authentication information and/or phone numbers stored in the SIM card in a new electronic device by inserting the removable SIM card from the existing electronic device into the new electronic device.

In addition to the removable physical SIM card, as described above, an eSIM capable of remotely installing a profile for providing a communication service, through a network, has been proposed. The eSIM may be fixed in an electronic device in the form of, for example, a chip and mounted in advance, in the process of manufacturing the electronic device. The eSIM may be used in an electronic device that may have a structure in which the physical SIM card is not easily attached and detached.

In the case of a physical SIM card that is removable when a user replaces an electronic device, the user may use the network and application services of the communication service provider as it is, by inserting the SIM card of the existing electronic device into a new electronic device.

However, when the user replaces the electronic device with a new electronic device including an eSIM, the user must access a server of the communication service provider and complete an authentication process through a web page provided by the communication service provider, and then download and install an eSIM profile in the new electronic device, to use the network and application services of the communication service provider.

SUMMARY

The disclosure has been made to address the above-mentioned problems and disadvantages, and to provide at least the advantages described below.

According to an aspect of the disclosure, an electronic device includes a communication module, an eSIM in which at least one profile is stored, and a processor configured to, when accessing a server and succeeding in authentication for a first profile among at least one profile stored in the eSIM, receive an authentication token indicating successful authentication for the first profile from the server, when establishing communication with a first electronic device through the communication module, inform the first electronic device that the first profile is transmittable data, and when transmission of the first profile is requested from the first electronic device, transmit, to the first electronic device, the authentication token for downloading a second profile corresponding to the first profile from the server.

According to another aspect of the disclosure, an electronic device includes a communication module, an eSIM, and a processor configured to, establish communication with a first electronic device through the communication module; in response to a transmission request for a first profile of the first electronic device, when receiving an authentication token from the first electronic device, display notification information for installing the first profile; and when identifying selection of the notification information, download a second profile corresponding to the first profile of the first electronic device to a server using the authentication token.

According to another aspect of the disclosure, a method for installing an eSIM profile in an electronic device includes, when accessing a server and succeeding in authentication for a first profile among at least one profile stored in the eSIM, receiving an authentication token indicating successful authentication for the first profile from the server; when establishing communication with a first electronic device through a communication module of the electronic device, informing the first electronic device that the first profile is transmittable data; and when transmission of the first profile is requested from the first electronic device, transmitting, to the first electronic device, the authentication token for downloading a second profile corresponding to the first profile from the server.

According to another aspect of the disclosure, a method for installing an eSIM profile in an electronic device includes establishing communication with a first electronic device through a communication module of the electronic device; in response to a transmission request for a first profile of the first electronic device, when receiving an authentication token from the first electronic device, displaying notification information for installing the first profile, and when identifying selection of the notification information, downloading a second profile corresponding to the first profile of the first electronic device to a server using the authentication token.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
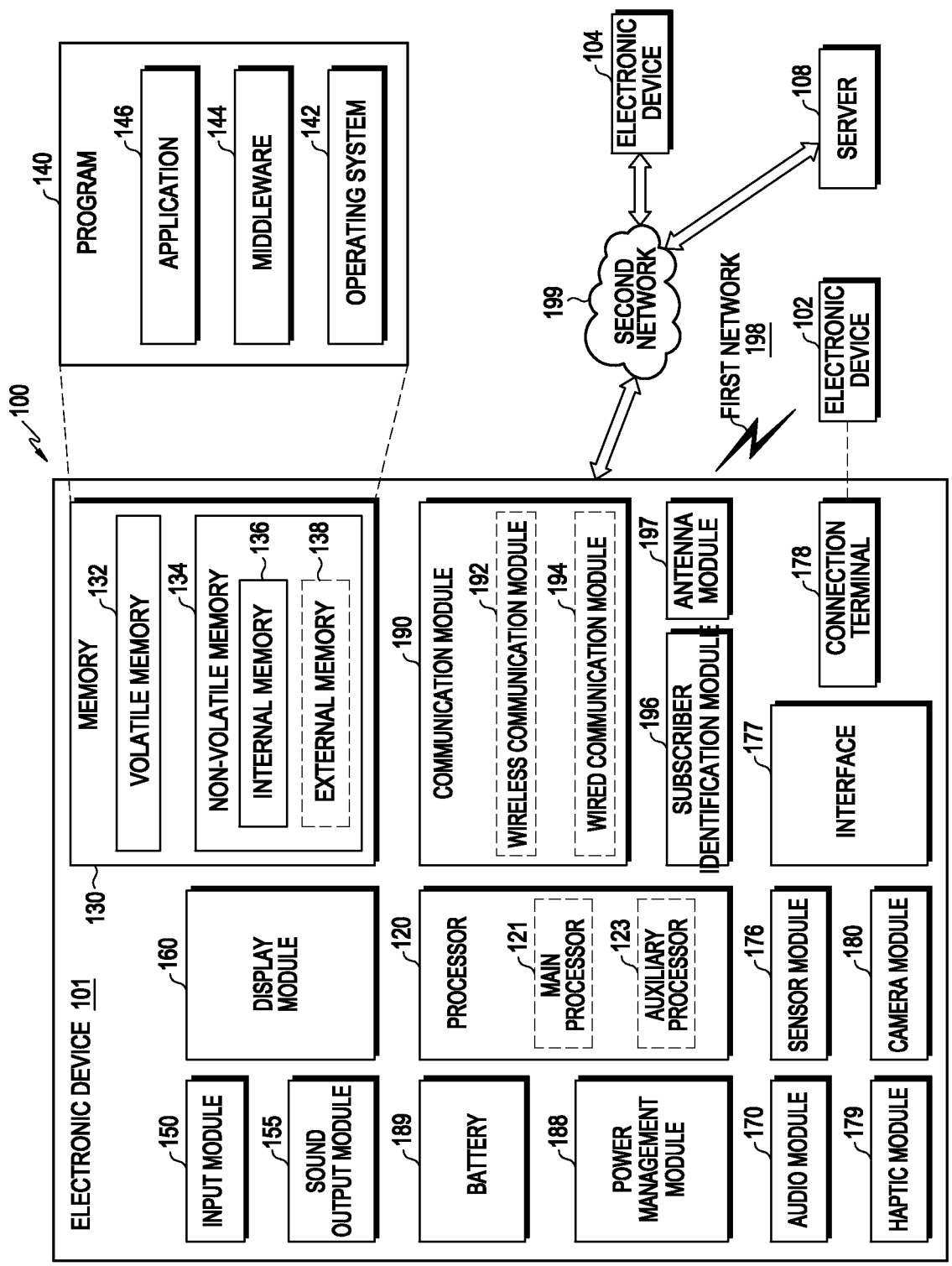
FIG. 1 illustrates an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to various embodiments, an electronic device and a method for installing an eSIM profile in the electronic device are provided.

According to various embodiments, when a user replaces an old electronic device with a new electronic device including an eSIM, the eSIM profile may be provided in a safe and comfortable way.

FIG. 1 illustrates an electronic device in a network environment according to an embodiment.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a haptic module 179, a camera module 180, a power management module 188, a battery 189, a communication module 190, a SIM 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network, or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or Infrared Data Association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
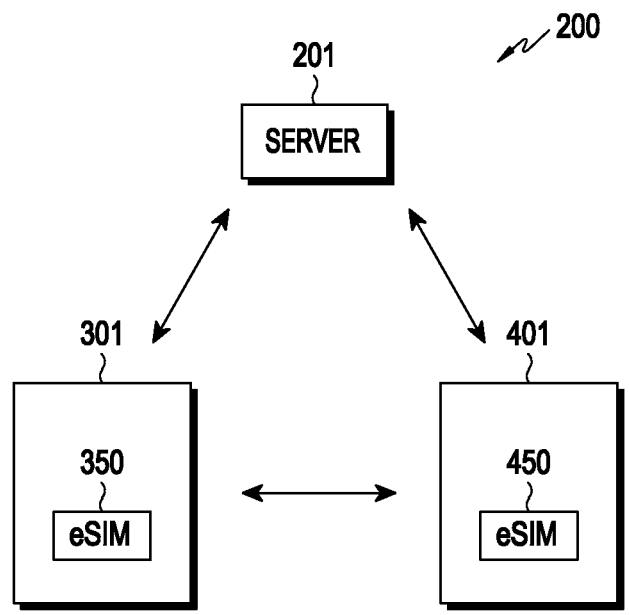
FIG. 2 illustrates a system for moving a profile between electronic devices, according to an embodiment.

FIG. 2 illustrates a system for moving a profile between electronic devices, according to an embodiment.

Referring to FIG. 2, a system 200 includes a server 201, a first electronic device 301, and a second electronic device 401.

The server 201 may be a server of a communication service provider capable of providing a communication service such as voice communication or data communication, may provide the first electronic device 301 or the second electronic device 401 with a profile for using a communication service provided by the communication service provider or an authentication token for downloading the profile.

The server 201 may provide the first electronic device 301 storing a first profile (e.g., a first eSIM profile) with server configuration information including server access information and an authentication method supported by the server. The server access information may include server access uniform resource link (URL) information. The authentication method supported by the server may include, for example, an extensible authentication protocol for authentication and key agreement (EAP-AKA) authentication method, and may include various authentication methods other than the EAP-AKA.

When an authentication token is requested from the first electronic device 301, the server 201 may perform an authentication operation on the first profile stored in the first electronic device 301 using an authentication method (e.g., an EAP-AKA authentication method) supported by the server. When succeeding in authentication for the first profile stored in the first electronic device 301, the server 201 may generate an authentication token indicating successful authentication for the first profile, and transmit the generated authentication token to the first electronic device 301.

When receiving profile request information including an authentication token from the second electronic device 401, the server 201 may check the eligibility of the authentication token. When identifying that the authentication token received from the second electronic device 401 is an authentication token generated by the server 201, the server 201 may determine that the authentication token is eligible. When determining that the authentication token is eligible, the server 201 may generate a second profile (e.g., a second eSIM profile) corresponding to the first profile (e.g., the first eSIM profile) authenticated with the authentication token and stored in the first electronic device 301, and transmit the generated second profile to the second electronic device 401. The second profile may include the same information (e.g., the same subscription information) as the first profile or may include similar information (e.g., similar subscription information).

When receiving an authentication token for the first profile stored in an eSIM 350 from the server 201, the first electronic device 301 may transmit the authentication token for downloading a second profile corresponding to the first profile stored in the first electronic device 301 to the second electronic device 401 to which its communication is connected.

When succeeding in authentication for the first profile with an authentication method supported by the server 201 and receiving the authentication token from the server 201, the first electronic device 301 may provide the first profile as transmittable data to the second electronic device 401 to which its communication is connected.

When transmission of the first profile is requested from the second electronic device 401, the first electronic device 301 may transmit the authentication token to the second electronic device 401.

The second electronic device 401 may perform the same operation as the first electronic device 301.

When receiving an authentication token from the first electronic device 301 with which communication is established, the second electronic device 401 may display notification information for profile installation, and when identifying selection of the notification information, the second electronic device 401 may download a second profile corresponding to the first profile from the server 201 using the authentication token, and store and install it in an eSIM 450.

When receiving the first profile stored in the first electronic device 301 as transmittable data, the second electronic device 401 may receive the authentication token received from the first electronic device 301 according to the transmission request for the first profile.

The first electronic device 301 may perform the same operation as the second electronic device 401.

Figure 3:
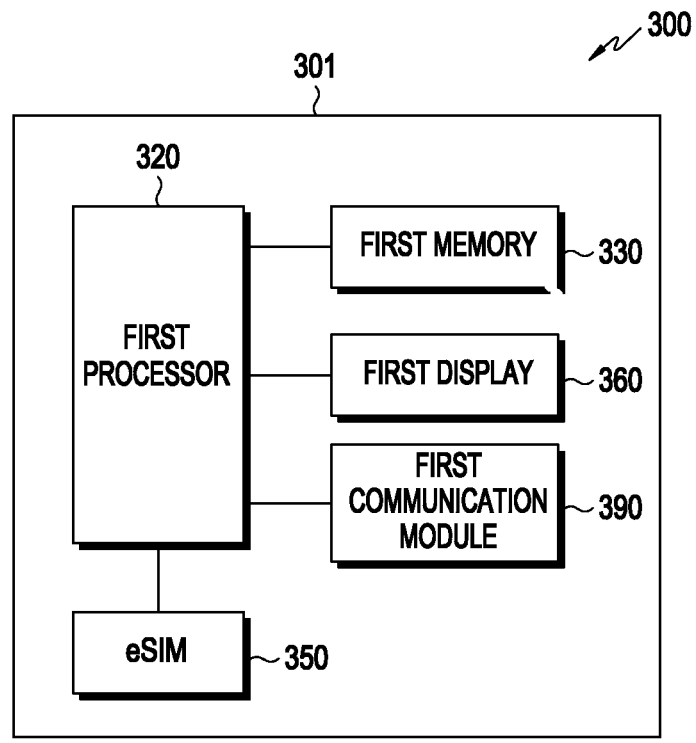
FIG. 3 illustrates a first electronic device, according to an embodiment.

FIG. 3 illustrates a first electronic device, according to an embodiment.

Referring to FIG. 3, the first electronic device 301 includes a first processor 320, a first memory 330, a first display 360, a first communication module 390, and an eSIM 350.

The first processor 320 may receive an authentication token indicating successful authentication for the first profile (e.g., the first eSIM profile) stored in the eSIM 350 from the server.

The first processor 320 may identify a first profile currently activated or selected by a user from among at least one profile stored in the eSIM 350, and download server configuration information from the server of a communication service provider that provides a communication service to the first electronic device 301 using the first profile.

The first processor 320 may identify server access information (e.g., server access URL information) and/or an authentication method (e.g., an EAP-AKA authentication method) supported by the server, which are included in the server configuration information.

The first processor 320 may access the server based on the server access information and request authentication of the first profile based on the authentication method supported by the server. When succeeding in authentication for the first profile based on the authentication method supported by the server, the first processor 320 may receive an authentication token indicating successful authentication for the first profile from the server. When failing in authentication for the first profile based on the authentication method supported by the server, the first processor 320 may receive information indicating the failure of the authentication for the first profile from the server.

The first processor 320 may transmit an authentication token for downloading a second profile corresponding to the first profile to the second electronic device 401 with which its communication is established.

The first processor 320 may establish short-range wireless communication (e.g., Wi-Fi direct) or wired communication (e.g., on the go (OTG) communication) with the second electronic device through the first communication module 390.

The first processor 320 may provide the first profile as transmittable data to the second electronic device 401.

The first processor 320 may provide a data list indicating a plurality of transmittable data including the first profile to the second electronic device 401.

When transmission of the first profile is requested from the second electronic device 401, the first processor 320 may transmit an authentication token that is received from the server upon successful authentication for the first profile, to the second electronic device 401.

The first memory 330 may be implemented substantially the same as or similar to the memory 130 of FIG. 1.

The first display 360 may be implemented substantially the same as or similar to the display module 160 of FIG. 1.

The first processor 320 may display, on the first display 360, information informing of reception of an authentication token indicating authentication success for the first profile stored in the eSIM 350, or display information informing of authentication failure for the first profile.

The first communication module 390 may be implemented substantially the same as or similarly to the communication module 190 of FIG. 1, and may include a plurality of communication circuits using different communication technologies.

The first communication module 390 may include at least one of a wireless LAN module and a short-range communication module, and may include, as the short-range communication module, an ultra-wide band (UWB) communication module, a Wi-Fi communication module, an NFC communication module, a Bluetooth legacy communication module, and/or a BLE communication module.

Figure 4:
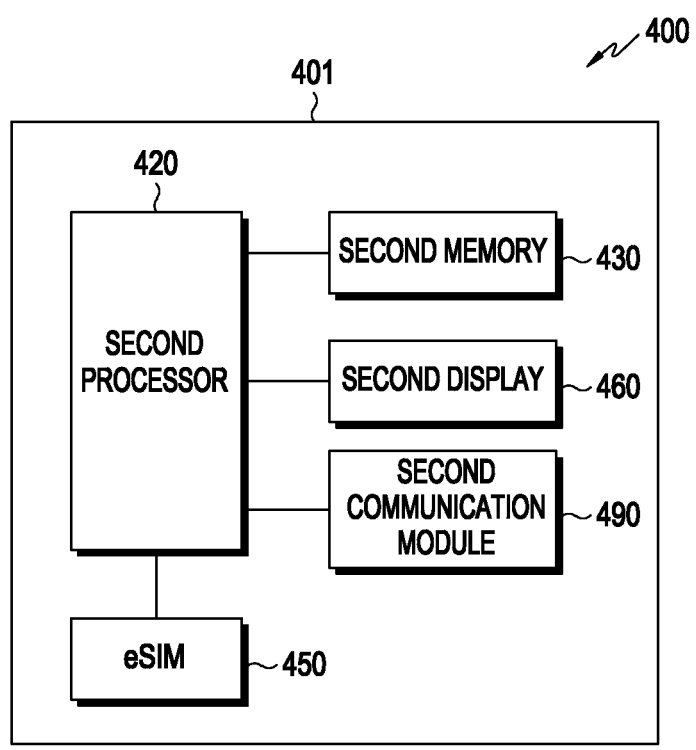
FIG. 4 illustrates a second electronic device, according to an embodiment.

The eSIM 350 may store at least one profile and receive a wireless communication service provided by at least one communication service provider using each of the at least one profile FIG. 4 illustrates a second electronic device, according to an embodiment.

Referring to FIG. 4, the second electronic device 401 includes a second processor 420, a second memory 430, a second display 460, a second communication module 490, and an eSIM 450.

The second processor 420 may download and install a second profile (e.g., a second eSIM profile) corresponding to the first profile (e.g., the first eSIM profile) of the first electronic device from the server using the authentication token received from the first electronic device 301 with which its communication is established.

The second processor 420 may establish short-range wireless communication (e.g., Wi-Fi direct) or wired communication (e.g., OTG) with the first electronic device through the second communication module 490.

When receiving the first profile of the first electronic device as transmittable data from the first electronic device, the second processor 420 may display the first profile on the second display 460 so that it can be selected by the user.

When receiving a data list indicating a plurality of transmittable data including the first profile from the first electronic device, the second processor 420 may display the received data list on the second display 460.

When identifying selection of the first profile by the user, the second processor 420 may request transmission of the first profile from the first electronic device.

When receiving an authentication token from the first electronic device in response to the transmission request of the first profile, the second processor 420 may display notification information for installation of the first profile on the second display 460.

When identifying selection of the notification information, the second processor 420 may transmit profile request information including an authentication token received from the first electronic device, to the server.

The second processor 420 may download a second profile corresponding to the first profile from the server that determines that the authentication token is eligible, and may store and install the downloaded second profile in the eSIM 450.

The second processor 420 may use a wireless communication service provided by the communication service provider by using the second profile stored in the eSIM 450.

The second processor 420 may receive information notifying the authentication failure from the server, which has determined that the authentication token is not eligible.

When identifying selection of the notification information, the second processor 420 may identify whether there is an additional authentication method for the first profile, and if there is no additional authentication method for the first profile, transmit profile request information including an authentication token received from the first electronic device, to the server.

When identifying the selection of the notification information, the second processor 420 may identify whether there is an additional authentication method for the first profile, and if there is an additional authentication method for the first profile, perform authentication through the additional authentication method (e.g., identification (ID) and password entry), and when the additional authentication is successful, transmit profile request information including an authentication token received from the first electronic device, to the server. The additional authentication method may be provided differently for each communication service provider.

The second memory 430 may be implemented substantially the same as or similar to the memory 130 of FIG. 1.

The second display 460 may be implemented substantially the same as or similar to the display module 160 of FIG. 1.

The second processor 420 may display, on the second display 460, a first profile provided as transmittable data from the first electronic device, or a data list indicating a plurality of transmittable data including the first profile.

The second processor 420 may display notification information for installing the first profile on the second display 460.

The second communication module 490 may be implemented substantially the same as or similar to the communication module 190 of FIG. 1, and may include a plurality of communication circuits using different communication technologies.

The second communication module 490 may include at least one of a wireless LAN module and a short-range communication module, and may include, as the short-range communication module, a UWB communication module, a Wi-Fi communication module, an NFC communication module, a Bluetooth legacy communication module, and/or a BLE communication module.

The eSIM 450 may store a second profile received from the server 201 or at least one profile including the second profile.

An electronic device may include a communication module, an eSIM in which at least one profile is stored, and a processor. The processor may be configured to, when accessing a server and succeeding in authentication for a first profile among at least one profile stored in the eSIM, receive an authentication token indicating successful authentication for the first profile from the server, when establishing communication with a first electronic device through the communication module, inform the first electronic device that the first profile is transmittable data, and when transmission of the first profile is requested from the first electronic device, transmit, to the first electronic device, the authentication token for downloading a second profile corresponding to the first profile from the server.

The first profile may indicate an activated profile among the at least one profile.

The first profile may indicate a profile selected by a user from among the at least one profile.

The processor may be configured to receive server configuration information from the server of a communication service provider providing the first profile, access the server based on server access information included in the server configuration information, and perform an authentication operation on the first profile with the server based on an authentication method supported by the server, included in the server configuration information.

The processor may be configured to, when establishing communication with the first electronic device, transmit a data list indicating a plurality of transmittable data including the first profile to the first electronic device.

An electronic device may include a communication module, an eSIM, and a processor. The processor may be configured to establish communication with a first electronic device through the communication module; in response to a transmission request for a first profile of the first electronic device, when receiving an authentication token from the first electronic device, display notification information for installing the first profile; and when identifying selection of the notification information, download a second profile corresponding to the first profile of the first electronic device to a server using the authentication token.

The processor may be configured to, when establishing communication with the first electronic device, display a data list received from the first electronic device, and when identifying selection of the first profile from the data list, request transmission of the first profile from the first electronic device.

The processor may be configured to, when identifying the selection of the notification information, transmit the authentication token to the server, and receive the second profile from the server that determines that the authentication token is eligible.

The processor may be configured to, when identifying the selection of the notification information, identify whether there is an additional authentication method for the first profile, and when there is an additional authentication method for the first profile, perform authentication through the additional authentication method, and when the additional authentication is successful, transmit the authentication token to the server.

The processor may be configured to download and install the second profile in the eSIM.

Figure 5:
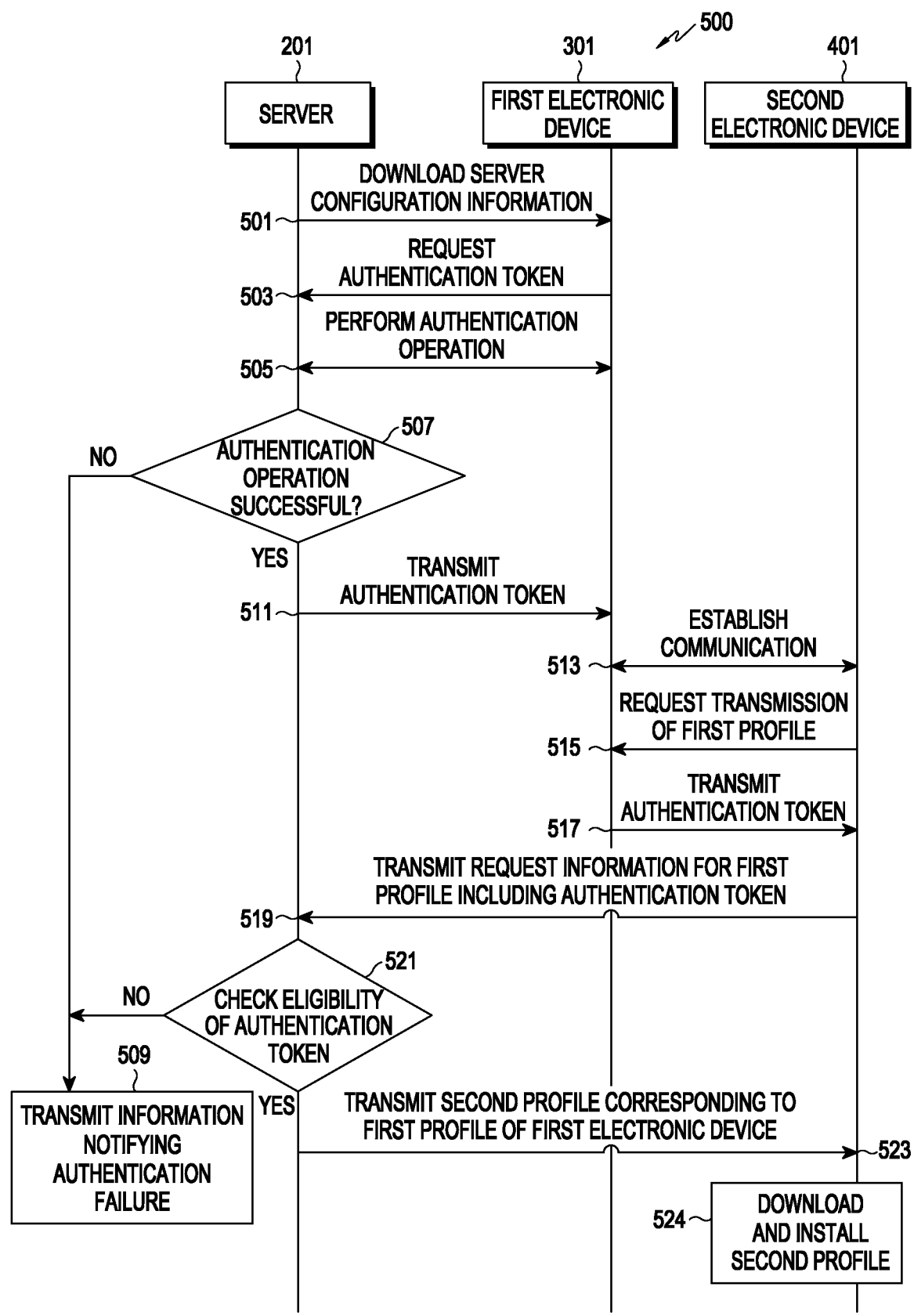
FIG. 5 is a flowchart illustrating an operation of moving a profile between electronic devices, according to an embodiment.

FIG. 5 is a flowchart 500 illustrating an operation of moving a profile between electronic devices, according to an embodiment. Operations of moving the profile may include steps 501 to 524. At least one of steps 501 to 524 may be omitted, the order of some steps may be changed, or other steps may be added. The operation of moving the profile may be performed by the electronic device 101 of FIG. 1, the processor 120 of FIG. 1, the first electronic device 301 of FIG. 3, the first processor 320 of FIG. 3, and the second electronic device 401 of FIG. 4, or the second processor 420 of FIG. 4.

Referring to FIG. 5, in step 501, the first electronic device 301 downloads server configuration information from the server 201.

The first electronic device 301 may download server configuration information from a server of a communication service provider that provides a first profile currently activated or selected by a user among at least one profile stored in the eSIM 350 of the first electronic device 301.

The first electronic device 301 may identify server access information (e.g., server access URL information) and/or an authentication method (e.g., an EAP-AKA authentication method) supported by the server, which are included in the server configuration information.

In step 503, the first electronic device 301 requests an authentication token from the server 201

The first electronic device 301 may access the server based on the server access information included in the server configuration information, and request an authentication token according to the authentication success for the first profile based on the authentication method supported by the server, included in the server configuration information.

In step 505, the server 201 performs an authentication operation with the first electronic device 301.

When an authentication token is requested from the first electronic device 301, the server 201 may perform an authentication operation on the first profile stored in the first electronic device 301 using the authentication method (e.g., an EAP-AKA method) supported by the server.

In step 507, the server 201 determines whether the authentication operation with the first electronic device 301 is successful.

If the server 201 fails, in step 507, to authenticate the first profile stored in the first electronic device 301 based on the authentication method supported by the server, the server 201 transmits, in step 509, information notifying of the failure of authentication for the first profile to the first electronic device 301.

If the server 201 succeeds in authentication for the first profile stored in the first electronic device 301 based on the authentication method supported by the server in step 507, the server 201 may generate an authentication token indicating successful authentication for the first profile, and transmit the generated authentication token to the first electronic device 301, in step 511.

In step 513, the first electronic device 301 establishes communication with a second electronic device 401.

The first electronic device 301 may establish short-range wireless communication (e.g., Wi-Fi direct) or wired communication (e.g., OTG) with the second electronic device through the first communication module 390.

The first electronic device 301 may provide the first profile as transmittable data to the second electronic device 401 through the short-range wireless communication (e.g., Wi-Fi direct) or the wired communication (e.g., OTG).

The first electronic device 301 may provide a data list indicating a plurality of transmittable data including the first profile to the second electronic device 401 through the short-range wireless communication (e.g., Wi-Fi direct) or the wired communication (e.g., OTG).

In step 515, the second electronic device 401 requests transmission of the first profile from the first electronic device 301.

The second electronic device 401 may request transmission of the first profile from the first electronic device 301, when identifying selection of the first profile displayed on the second display 460 of the second electronic device 401, or selection of the first profile from the data list indicating a plurality of transmittable data including the first profile.

In step 517, the first electronic device 301 transmits an authentication token to the second electronic device 401.

When transmission of the first profile is requested from the second electronic device 401, the first electronic device 301 may transmit the authentication token that is received from the server 201 upon successful authentication for the first profile, to the second electronic device 401.

In step 519, the second electronic device 401 transmits request information for a profile including an authentication token to the server 201.

When receiving an authentication token from the first electronic device 301, the second electronic device 401 may display notification information for installing the first profile on the second display 460 of the second electronic device 401.

When identifying selection of the notification information, the second electronic device 401 may transmit the request information for the first profile including the authentication token received from the first electronic device 301, to the server 201.

In step 521, the server 201 checks the eligibility of the authentication token.

If the eligibility check fails, in step 521, to identify that the authentication token received from the second electronic device 401 is an authentication token generated by the server 201, the server 201 determines that the authentication token is not eligible, and in step 509, the server 201 transmits information notifying the authentication failure for the first profile, to the second electronic device 401.

If the eligibility check is approved, in step 521, and the authentication token received from the second electronic device 401 is an authentication token generated by the server 201, then in step 523, the server 201 generates a second profile (e.g., the second eSIM profile) corresponding to the first profile (e.g., the first eSIM profile) authenticated with the authentication token and stored in the first electronic device 301, and transmits the generated second profile to the second electronic device 401.

In step 524, the second electronic device 401 downloads and installs the second profile from the server 201.

The second electronic device 401 may store and install the second profile downloaded from the server 201 in the eSIM 450 of the second electronic device 401.

The second electronic device 401 may use a wireless communication service provided by the communication service provider by using the second profile stored in the eSIM.

Figure 6:
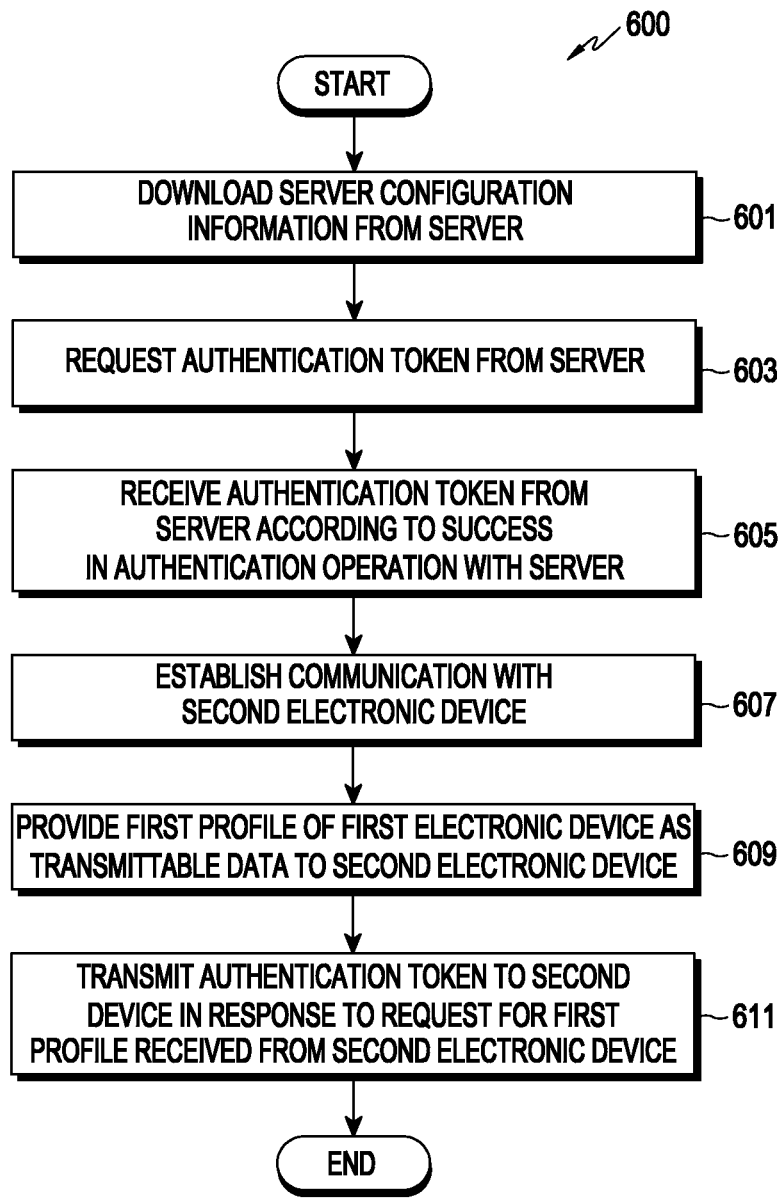
FIG. 6 is a flowchart illustrating an operation of moving a profile in a first electronic device, according to an embodiment.

FIG. 6 is a flowchart 600 illustrating an operation of moving a profile in a first electronic device, according to an embodiment. Operations of moving the profile may include steps 601 to 611. At least one of steps 601 to 611 may be omitted, the order of some steps may be changed, or other steps may be added. The operation of moving the profile may be performed by the electronic device 101 of FIG. 1, the processor 120 of FIG. 1, the first electronic device 301 of FIG. 3, or the first processor 320 of FIG. 3.

In steps 601, the first electronic device 301 downloads server configuration information from a server 201.

The first electronic device 301 may download server configuration information from the server of the communication service provider that provides a first profile among at least one profile stored in the eSIM 350 of the first electronic device 301.

The first profile among the at least one profile stored in the eSIM 350 of the first electronic device 301 may include a currently activated profile or a profile selected by a user.

The first electronic device 301 may identify server access information (e.g., server access URL information) and/or an authentication method (e.g., an EAP-AKA authentication method) supported by the server, which are included in the server configuration information.

In steps 603, the first electronic device 301 requests an authentication token from the server 201.

The first electronic device 301 accesses the server based on the server access information included in the server configuration information, and requests an authentication token according to the authentication success of the first profile based on an authentication method supported by the server, included in the server configuration information.

In step 605, the first electronic device 301 receives an authentication token from the server according to the success in the authentication operation with the server 201.

When succeeding in authentication for the first profile stored in the first electronic device 301 based on an authentication method (e.g., an EAP-AKA method) supported by the server, the first electronic device 301 may receive an authentication token generated by the server from the server.

In step 607, the first electronic device 301 establishes communication with the second electronic device 401.

The first electronic device 301 may establish short-range wireless communication (e.g., Wi-Fi direct) or wired communication (e.g., OTG) with the second electronic device through a first communication module 390.

In step 609, the first electronic device 301 provides the first profile of the first electronic device as transmittable data to the second electronic device.

The first electronic device 301 may transmit the first profile as transmittable data to the second electronic device through the short-range wireless communication (e.g., Wi-Fi direct) or the wired communication (e.g., OTG).

The first electronic device 301 may transmit a data list indicating a plurality of transmittable data including the first profile to the second electronic device through the short-range wireless communication (e.g., Wi-Fi direct) or the wired communication (e.g., OTG).

In step 611, the first electronic device 301 transmits an authentication token to the second electronic device in response to the request for the first profile, received from the second electronic device 401.

When transmission of the first profile is requested from the second electronic device, the first electronic device 301 may transmit the authentication token that is received from the server upon successful authentication for the first profile, to the second electronic device.

FIG. 6 describes an embodiment in which an authentication token for a first profile currently activated or selected by a user from among at least one profile stored in the first electronic device 301 is received from the server. In addition, a plurality of authentication tokens for a plurality of profiles may be selected by the user among the at least one profile stored in the eSIM 350 of the first electronic device, and may be received from the server through the operations illustrated in FIG. 6. For example, when an authentication token for a plurality of profiles selected by the user among at least one profile stored in the eSIM 350 of the first electronic device is requested, the first electronic device 301 may receive server configuration information from a plurality of servers corresponding to each of the selected plurality of profiles, and receive an authentication token indicating success of authentication for the plurality of profiles from each of the plurality of servers based on the server configuration information (e.g., server access information and/or an authentication method supported by the server). The first electronic device 301 may provide, as transmittable data, a plurality of profiles corresponding to the plurality of authentication tokens to the second electronic device with which its communication is established.

Figure 7:
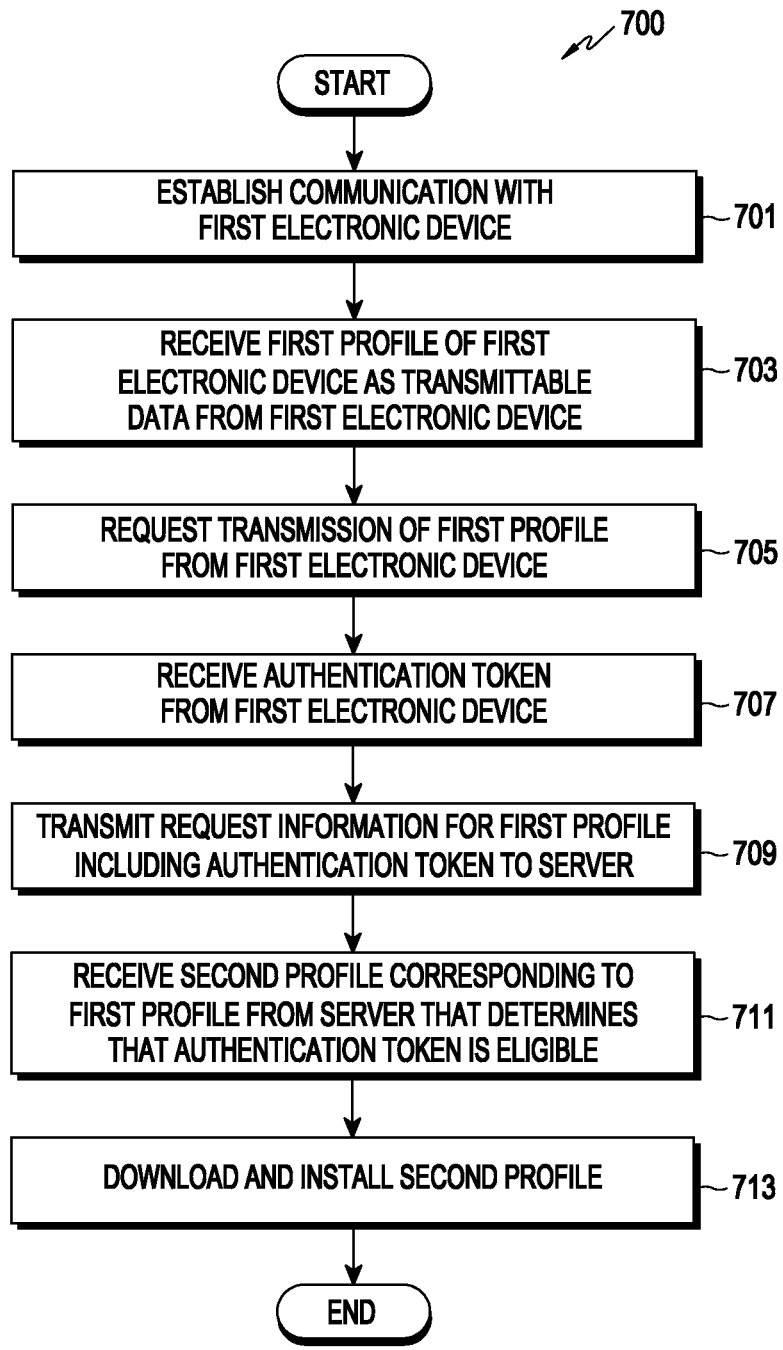
FIG. 7 is a flowchart illustrating an operation of moving a profile in a second electronic device, according to an embodiment.

FIG. 7 is a flowchart 700 illustrating an operation of moving a profile in a second electronic device, according to an embodiment. FIGS. 8A to 8E are diagrams 800a to 899e illustrating operations of moving a profile in a second electronic device, according to various embodiments. Moving the profile may include steps 701 to 713. At least one of steps 701 to 713 may be omitted, the order of some steps may be changed, or other steps may be added. The step of moving the profile may be performed by the electronic device 101 of FIG. 1, the processor 120 of FIG. 1, the second electronic device 401 of FIG. 4, or the second processor 420 of FIG. 4.

Referring to FIG. 7, in step 701, the second electronic device 401 establishes communication with the first electronic device 301.

The second electronic device 401 may establish short-range wireless communication (e.g., Wi-Fi direct) or wired communication (e.g., OTG) with the first electronic device through a second communication module 490.

In step 703, the second electronic device 401 receives the first profile of the first electronic device as transmittable data from the first electronic device 301.

The second electronic device 401 may receive the first profile as transmittable data through the short-range wireless communication (e.g., Wi-Fi direct) or the wired communication (e.g., OTG), and display the first profile as the transmittable data on a second display 460 of the second electronic device 401.

The second electronic device 401 may receive a data list indicating a plurality of transmittable data including the first profile through the short-range wireless communication (e.g., Wi-Fi direct) or the wired communication (e.g., OTG), and display the data list on the second display 460 of the second electronic device 401.

Figure 8A:
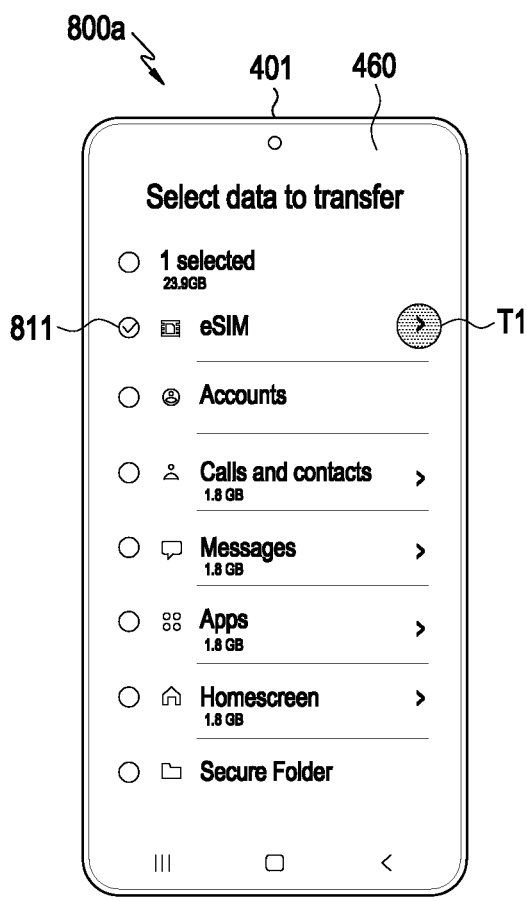
FIGS. 8A to 8E illustrate operations of moving a profile in a second electronic device, according to various embodiments.

The second electronic device 401 may display a data list indicating a plurality of transmittable data including profile data 811 on the second display 460 of the second electronic device 401 as shown in FIG. 8A. When displaying the data list, the second electronic device 401 may display the profile data (eSIM 811) among the plurality of transmittable data at the top.

In step 705, the second electronic device 401 requests transmission of the first profile from the first electronic device 301.

The second electronic device 401 may request transmission of the first profile from the first electronic device, when identifying selection of the first profile displayed on the second display 460 of the second electronic device 401, or selection of the first profile from the data list indicating a plurality of transmittable data including the first profile.

Figure 8B:
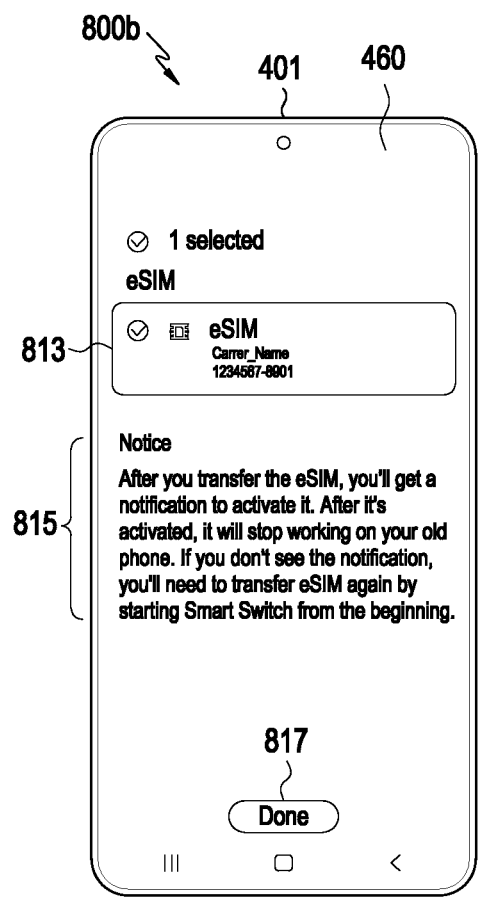
Figure 8C:
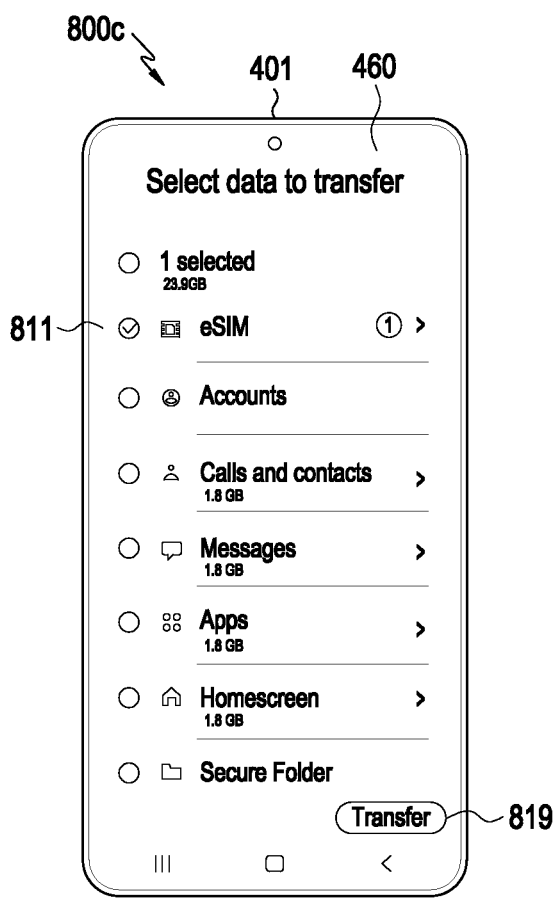
Figure 8D:
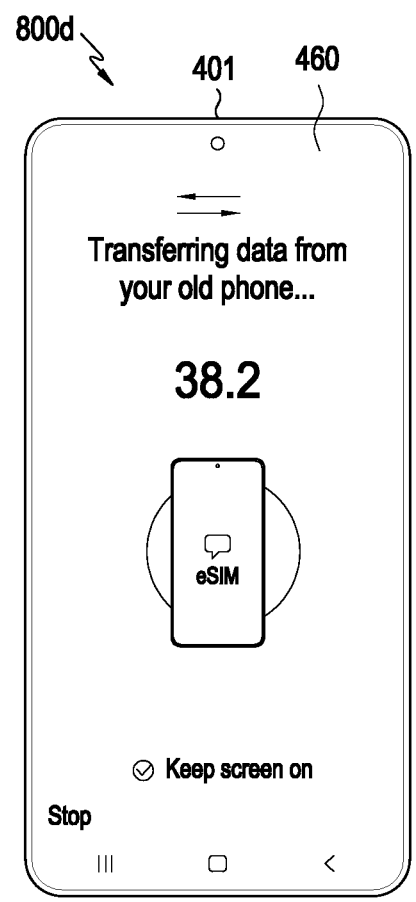

The second electronic device 401 may display a first profile 813 including profile data on the second display 460 as shown in FIG. 8B, upon identifying selection T1 of the profile data 811 by the user, while displaying a data list indicating a plurality of transmittable data including the profile data 811 on the second display 460 of the second electronic device 401 as shown in FIG. 8A. Upon identifying the selection of the first profile 813 in FIG. 8B, the second electronic device 401 may display, in a partial area of the second display 460, a user interface (UI) 815, which describes an installation operation of a profile and an explanation that the profile is not operated in the first electronic device after the profile is installed in the second electronic device. If a Done button 817 is selected after the first profile 813 is selected as shown in FIG. 8B, and if a Transfer button 819 is selected while displaying the first profile 813 is selected from the profile data 811 in the data list as shown in FIG. 8C, the second electronic device 401 may display a UI indicating that the selected first profile 813 is being transferred from the first electronic device to the second electronic device as shown in FIG. 8D.

In step 707, the second electronic device 401 receives an authentication token from the first electronic device 301.

In response to a request for the first profile, the second electronic device 401 may receive the authentication token that is received from the server 201 upon authentication success for the first profile, from the first electronic device 301.

In step 709, the second electronic device 401 transmits the request information for the first profile including the authentication token to the server 201.

When receiving an authentication token from the first electronic device, the second electronic device 401 may display notification information for installing the first profile on the second display 406 of the second electronic device 401.

When identifying the selection of the notification information, the second electronic device 401 may transmit the request information for the first profile including the authentication token received from the first electronic device, to the server.

Figure 8E:
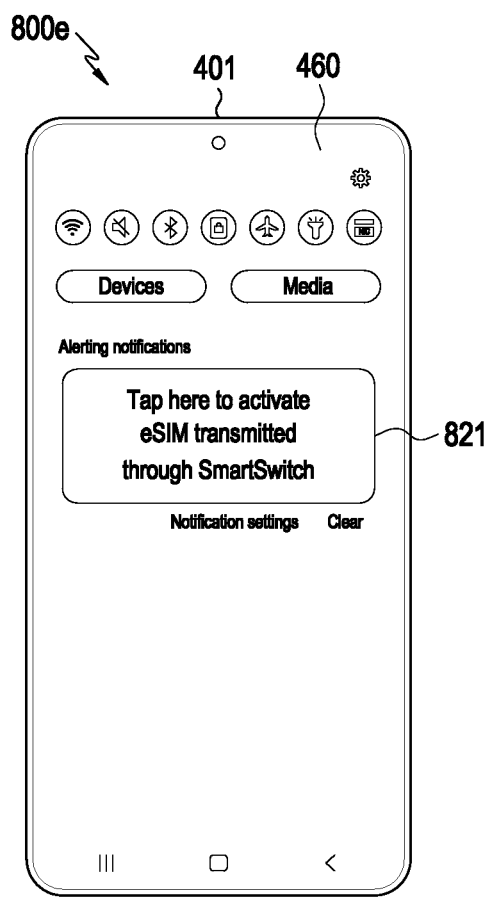

When receiving the authentication token for the first profile from the first electronic device as shown in FIG. 8E, the second electronic device 401 may display a UI 821 corresponding to the notification information for installing the first profile on the second display 460 of the second electronic device 401. When identifying the user's selection for the UI 821 corresponding to the notification information for installing the first profile, the second electronic device 401 may transmit request information for the first profile including the authentication token to the server. When identifying the selection of the UI 821 corresponding to the notification information, the second electronic device 401 may identify whether there is an additional authentication method for the first profile, and if there is an additional authentication method for the first profile, perform authentication using the additional authentication method (e.g., ID and password entry). If the additional authentication is successful, the second electronic device 401 may transmit profile request information including the authentication token received from the first electronic device to the server. The additional authentication method may be provided differently for each communication service provider.

In step 711, the second electronic device 401 may receive a second profile corresponding to the first profile from the server 201 that identifies that the authentication token is eligible.

The second electronic device 401 may receive a second profile (e.g., the second eSIM profile) corresponding to the first profile (e.g., the first eSIM profile) stored in the first electronic device from the server that determines that the authentication token is an authentication token generated by the server.

In step 713, the second electronic device 401 downloads and install the second profile.

The second electronic device 401 may store and install the second profile downloaded from the server in the eSIM 450 of the second electronic device 401.

The second electronic device 401 may use a wireless communication service provided by the communication service provider by using the second profile stored in the eSIM.

Figure 9A:
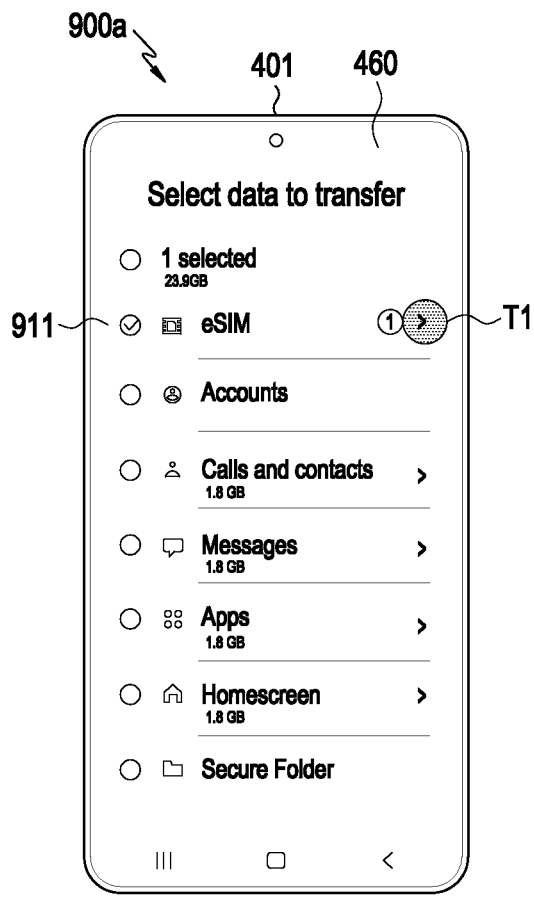
FIGS. 9A and 9B illustrate operations of moving a plurality of profiles in a second electronic device, according to various embodiments.
Figure 9B:
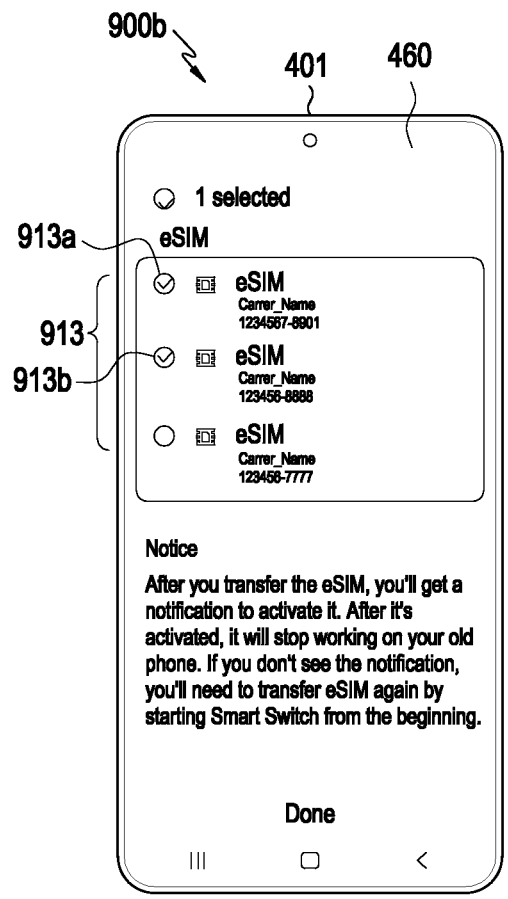

FIGS. 9A and 9B illustrate operations of moving a plurality of profiles in a second electronic device, according to various embodiments.

As shown in FIG. 9A, the second electronic device 401 may display a data list indicating a plurality of transmittable data including profile data 911 on the second display 460 of the second electronic device 401. When identifying selection T1 of the profile data 911 by the user while displaying the data list as shown in FIG. 9A, the second electronic device 401 may display a plurality of profiles 913 included in the profile data 911 on the second display 460 as shown in FIG. 9B. As shown in FIG. 9B, the second electronic device 401 may request the first electronic device to transmit a plurality of profiles 913a and 913b selected by the user among the plurality of profiles 913.

A method for installing an eSIM profile in an electronic device may include, when accessing a server and succeeding in authentication for a first profile among at least one profile stored in the eSIM, receiving an authentication token indicating successful authentication for the first profile from the server; when establishing communication with a first electronic device through a communication module of the electronic device, informing the first electronic device that the first profile is transmittable data; and when transmission of the first profile is requested from the first electronic device, transmitting, to the first electronic device, the authentication token for downloading a second profile corresponding to the first profile from the server.

The first profile may indicate an activated profile among the at least one profile.

The first profile may indicate a profile selected by a user from among the at least one profile.

The method may further include receiving server configuration information from the server of a communication service provider providing the first profile, accessing the server based on server access information included in the server configuration information, and performing an authentication operation on the first profile with the server based on an authentication method supported by the server, included in the server configuration information.

The method may further include, when establishing communication with the first electronic device, transmitting a data list indicating a plurality of transmittable data including the first profile to the first electronic device.

A method for installing an eSIM profile in an electronic device may include establishing communication with a first electronic device through a communication module of the electronic device; in response to a transmission request for a first profile of the first electronic device, when receiving an authentication token from the first electronic device, displaying notification information for installing the first profile; and when identifying selection of the notification information, downloading a second profile corresponding to the first profile of the first electronic device to a server using the authentication token.

The method may further include, when establishing communication with the first electronic device, displaying a data list received from the first electronic device, and when identifying selection of the first profile from the data list, requesting transmission of the first profile from the first electronic device.

The method may further include, when identifying the selection of the notification information, transmitting the authentication token to the server, and receiving the second profile from the server that determines that the authentication token is eligible.

The method may further include, when identifying the selection of the notification information, identifying whether there is an additional authentication method for the first profile; when there is an additional authentication method for the first profile, performing authentication through the additional authentication method; and when the additional authentication is successful, transmitting the authentication token to the server.

The method may further include downloading and installing the second profile in the eSIM of the electronic device.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a communication module;
   an embedded-subscriber identification module (eSIM) in which at least one profile is stored; and
   at least one processor; and
   memory storing instructions that, when executed by the at least one processor individually or collectively, cause the electronic device to:
   when accessing a server and succeeding in authentication for a first profile among at least one profile stored in the eSIM, receive an authentication token indicating successful authentication for the first profile from the server,
   when establishing communication with a first electronic device through the communication module, inform the first electronic device that the first profile is transmittable data and transmit a data list indicating a plurality of transmittable data including the first profile to the first electronic device, and when transmission of the first profile is requested from the first electronic device, transmit, to the first electronic device, the authentication token for downloading a second profile corresponding to the first profile from the server.

2. The electronic device of claim 1, wherein the first profile indicates an activated profile among the at least one profile.

3. The electronic device of claim 1, wherein the first profile indicates a profile selected by a user from among the at least one profile.

4. The electronic device of claim 1, wherein the instructions, when executed by the at least one processor individually or collectively, cause the electronic device to:
   receive server configuration information from the server of a communication service provider providing the first profile,
   access the server based on server access information included in the server configuration information, and
   perform an authentication operation on the first profile with the server based on an authentication method supported by the server, included in the server configuration information.

5. A method for installing an embedded-subscriber identification module (eSIM) profile in an electronic device, the method comprising:
   when accessing a server and succeeding in authentication for a first profile among at least one profile stored in the eSIM, receiving an authentication token indicating successful authentication for the first profile from the server;
   when establishing communication with a first electronic device through a communication module of the electronic device, informing the first electronic device that the first profile is transmittable data and transmitting a data list indicating a plurality of transmittable data including the first profile to the first electronic device; and
   when transmission of the first profile is requested from the first electronic device, transmitting, to the first electronic device, the authentication token for downloading a second profile corresponding to the first profile from the server.

6. The method of claim 5, wherein the first profile indicates an activated profile among the at least one profile.

7. The method of claim 5, wherein the first profile indicates a profile selected by a user from among the at least one profile.

8. The method of claim 5, further comprising:
   receiving server configuration information from the server of a communication service provider providing the first profile,
   accessing the server based on server access information included in the server configuration information, and
   performing an authentication operation on the first profile with the server based on an authentication method supported by the server, included in the server configuration information.

* * * * *